United States Patent [19]
Yoshizawa et al.

[11] Patent Number: 5,214,791
[45] Date of Patent: May 25, 1993

[54] RADIO COMMUNICATION APPARATUS CAPABLE OF PRODUCING AN ANNOUNCE WITH A REDUCED ERROR

[75] Inventors: Shigeo Yoshizawa, Tokyo; Mamoru Sakaguchi, Kanagawa, both of Japan

[73] Assignee: NEC Corporation, Tokyo, Japan

[21] Appl. No.: 767,773

[22] Filed: Sep. 30, 1991

[30] Foreign Application Priority Data

Sep. 29, 1990 [JP] Japan .................................. 2-258866

[51] Int. Cl.⁵ ............................................. H04B 7/00
[52] U.S. Cl. .................................. 455/38.2; 455/67.3; 455/226.4
[58] Field of Search ............... 455/226.2, 226.3, 226.4, 455/38.2, 67.3, 67.7, 186.1, 296, 38.1, 38.4, 156.1; 340/825.44, 825.16, 825.53, 825.47; 371/69.1, 70

[56] References Cited
FOREIGN PATENT DOCUMENTS

0062758  4/1985  Japan .................................. 371/69.1
0191427  8/1988  Japan .................................. 455/38.1

*Primary Examiner*—Curtis Kuntz
*Assistant Examiner*—C. Belzer
*Attorney, Agent, or Firm*—Sughrue, Mion, Zinn, Macpeak & Seas

[57] ABSTRACT

In a radio communication apparatus of a specific identification number, a control part (14) produces one of first and second control signals to make a loudspeaker (19) generate an announcement in response to a received radio signal carrying an intermittent succession of frames which are preassigned to the apparatus and each of which includes first and second codewords, each comprising a call number and received with a signal condition. The first control signal is produced in accordance with the identification number, the call number of the first codeword, and the signal condition of the second codeword. The second control signal is produced in accordance with the identification number, the call number of the second codeword, and the signal condition of the first codeword. The control part may additionally produce a third control signal.

8 Claims, 4 Drawing Sheets

RADIO COMMUNICATION APPARATUS CAPABLE OF PRODUCING AN ANNOUNCE WITH A REDUCED ERROR

BACKGROUND OF THE INVENTION

This invention relates to a radio communication apparatus for carrying out communication by the use of a radio signal. The radio communication apparatus may be a radio paging receiver, a transceiver, or the like although description will be mainly directed to the radio paging receiver.

Various conventional signals can be used as the radio signal in the radio paging receiver. One of the conventional signals includes a POCSAG (Post Office Code Standardisation Advisory Group) code as proposed by the British Post Office. The POCSAG code consists of a preamble signal and a plurality of batches which follow the preamble signal.

A conventional radio paging receiver includes a memory, a receiving unit, an announcing unit, and a control unit. The memory unit in for memorizing an identification number specific to the radio paging receiver. The receiving unit is for receiving the radio signal to produce a received signal which will be described in the following. The announcing unit is for announcing an announce to inform a user of the paging receiver of reception of the radio signal. The control unit is for controlling the announcing unit in accordance with the received signal with reference made to the identification number.

The received signal carries an intermittent succession of frames each of which comprises a first and a second codeword. Each of the first and the second codewords includes a call number and is supplied with a signal condition.

It will be assumed that the signal condition becomes worst when one of the codewords is influenced by noise and others. In this case, the announce may be an erroneous one. This is because the control unit carries out comparison between the identification number and the call number received within a predetermined error range and controls the announcing unit in accordance with a result of the comparison. Each codeword may be received within the predetermined error range even when the signal condition is appreciably unfavorable.

SUMMARY OF THE INVENTION

It is therefore an object of the present invention to provide a radio communication apparatus which is capable of producing an announce with a reduced error.

Other objects of this invention will become clear as the description proceeds.

According to this invention, there is provided a radio communication apparatus including a memory for memorizing an identification number specific to the apparatus, receiving means for receiving a radio signal to produce a received signal, announcing means for announcing an announce, and control means for controlling the announcing means in accordance with the identification number and the received signal. The received signal carries an intermittent succession of frames which are assigned to the radio communication apparatus and each of which comprises a first and a second codeword. Each of the first and the second codewords includes a call number and is received with a signal condition. The control means comprises first control signal producing, second control signal producing, and announce signal producing means. The first control signal producing means is connected to the receiving means and the memory and is for producing a first control signal in accordance with the identification number, the call number of the first codeword, and the signal condition of the second codeword. The second control signal producing means is connected to the receiving means and the memory and is for producing a second control signal in accordance with the identification number, the call number of the second codeword, and the signal condition of the first codeword. The announce signal producing means is connected to the first control signal producing, the second control signal producing, and the announcing means and is for producing an announce signal in accordance with the first and the second control signals to make the announcing means announce the announce in compliance with the announce signal.

DESCRIPTION OF THE PREFERRED EMBODIMENT

Figure 1:
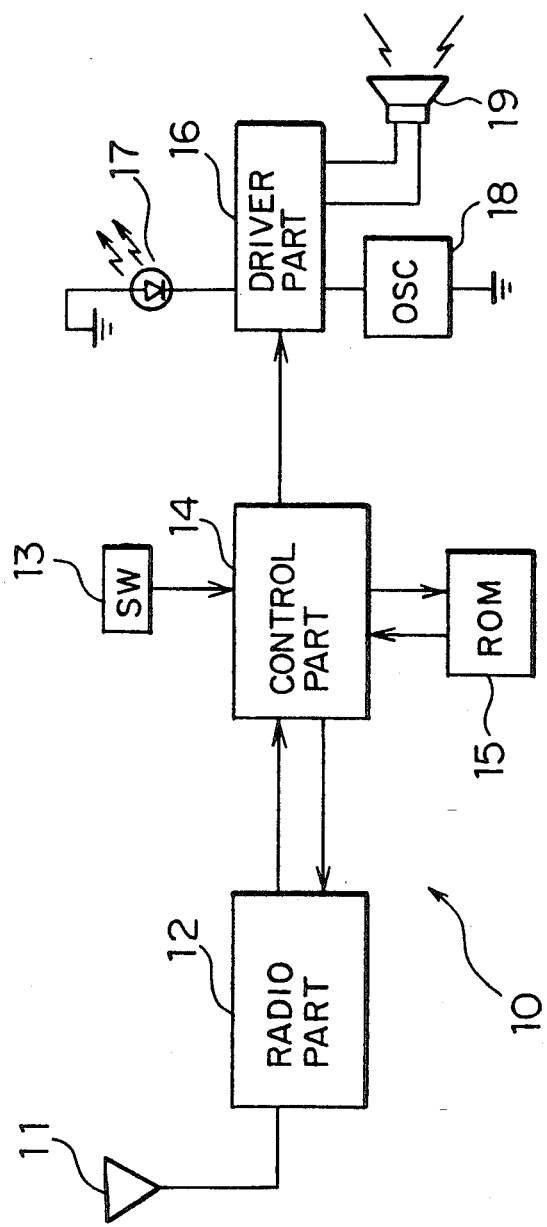
FIG. 1 is a block diagram of a radio communication apparatus according to a first embodiment of this invention.

Referring to FIG. 1, a radio communication apparatus according to a first embodiment of this invention is a radio paging receiver 10 and is for carrying out communication with other radio paging receivers (not illustrated) by the use of a radio signal including a POCSAG code which is described before. The other radio paging receivers are similar in structure and in operation to the radio paging receiver 10.

The radio paging receiver 10 comprises an antenna 11 for receiving the radio signal and is connected to a battery (not illustrated) which is for supplying electric power to the paging receiver 10. The radio signal is picked up by the antenna 11 and supplied to a radio part 12. When activated by the electric power supplied from the battery under operation of a power switch 13 in the manner which will presently be described, the radio part 12 converts or demodulates the radio signal into a demodulated signal which will hereafter be called a received signal. The received signal is supplied to a control part 14. Herein, a combination of the antenna 11 and the radio part 12 is referred to as a receiving arrangement. The power switch 13 supplies the electric power to the control part 14 and then to the radio part 12.

An ROM (read-only memory) is connected as a memory 15 to the control part 14. The memory 15 is for memorizing an identification number specific to the radio paging receiver 10. When activated by the electric power, the control part 14 cooperates with the memory 15 in response to the received signal to produce an announce signal in the manner which will later be described in detail.

The radio paging receiver 10 further comprises a driver part 16, a light emitting unit 17, an oscillator 18, and a loudspeaker 19 which will be described in the following.

The driver part 16 is connected to the control part 14 and is activated by the electric power. Each of the light emitting unit 17, the oscillator 18, and the loudspeaker 19 is connected to the driver part 16. The driver part 16 cooperates with the control part 14 and the oscillator 18 in response to the announce signal to make the light emitting unit 17 emits light and to make the loudspeaker 19 generate an audible tone. A combination of the driver part 16, the light emitting unit 17, and the loudspeaker 19 is herein referred to as an announcing arrangement which is for announcing an announce.

Figure 2:
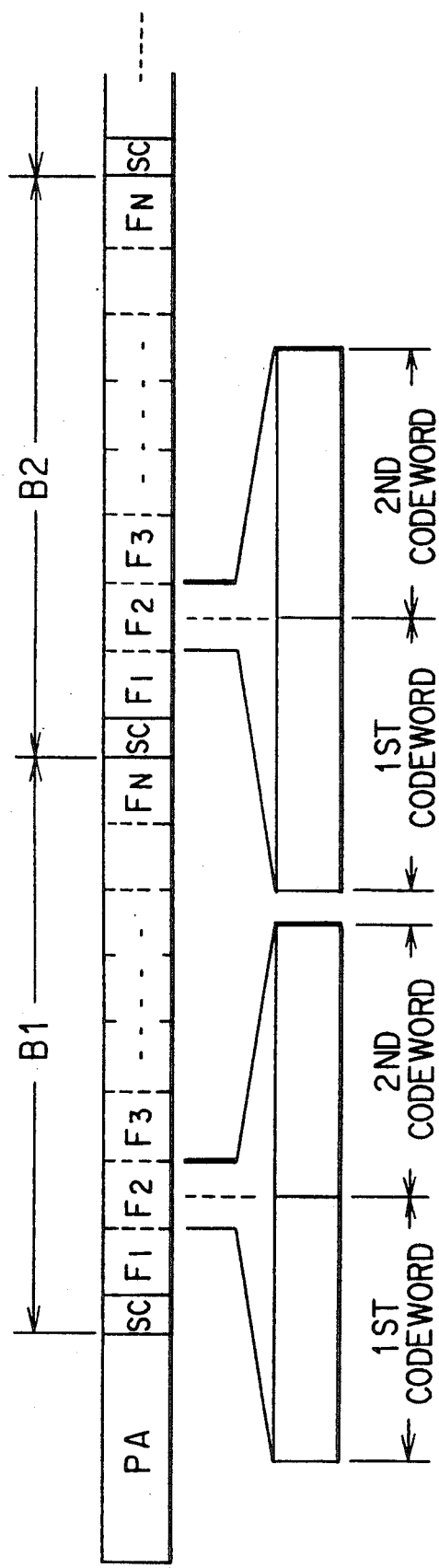
FIG. 2 is a signal format for use in describing operation of the radio communication apparatus illustrated in FIG. 1.

Turning to FIG. 2, description will be made as regards the received signal. The received signal carries a preamble signal PA and a plurality of batches B1, B2, . . . which follow the preamble signal PA. The preamble signal PA has, for example, an eighteen-codeword length when a unit codeword consists of, for example, thirty-two bits. The preamble signal PA is specified by a repetition of pulses which are of logic "1" and "0" levels.

Each of the batches B1, B2, . . . is made of a synchronization codeword SC and first and second through N-th frames F1 and F2 through FN which follow the synchronization codeword SC. As a result, n-th frames F1 through FN are an intermittent succession of frames in the batches B1, B2, . . . , where n is a preselected one of 1 through N, both inclusive.

Each n-th frame Fn comprises a first and a second codeword. Each of the first and the second codewords comprises a call number and is received with a signal condition determined while the codeword and the consideration is transmitted to the pager receiver 10 from the source which may be one of the other paging receivers. The call number is presented by a permutation of, for example, thirty-two bits.

Figure 3:
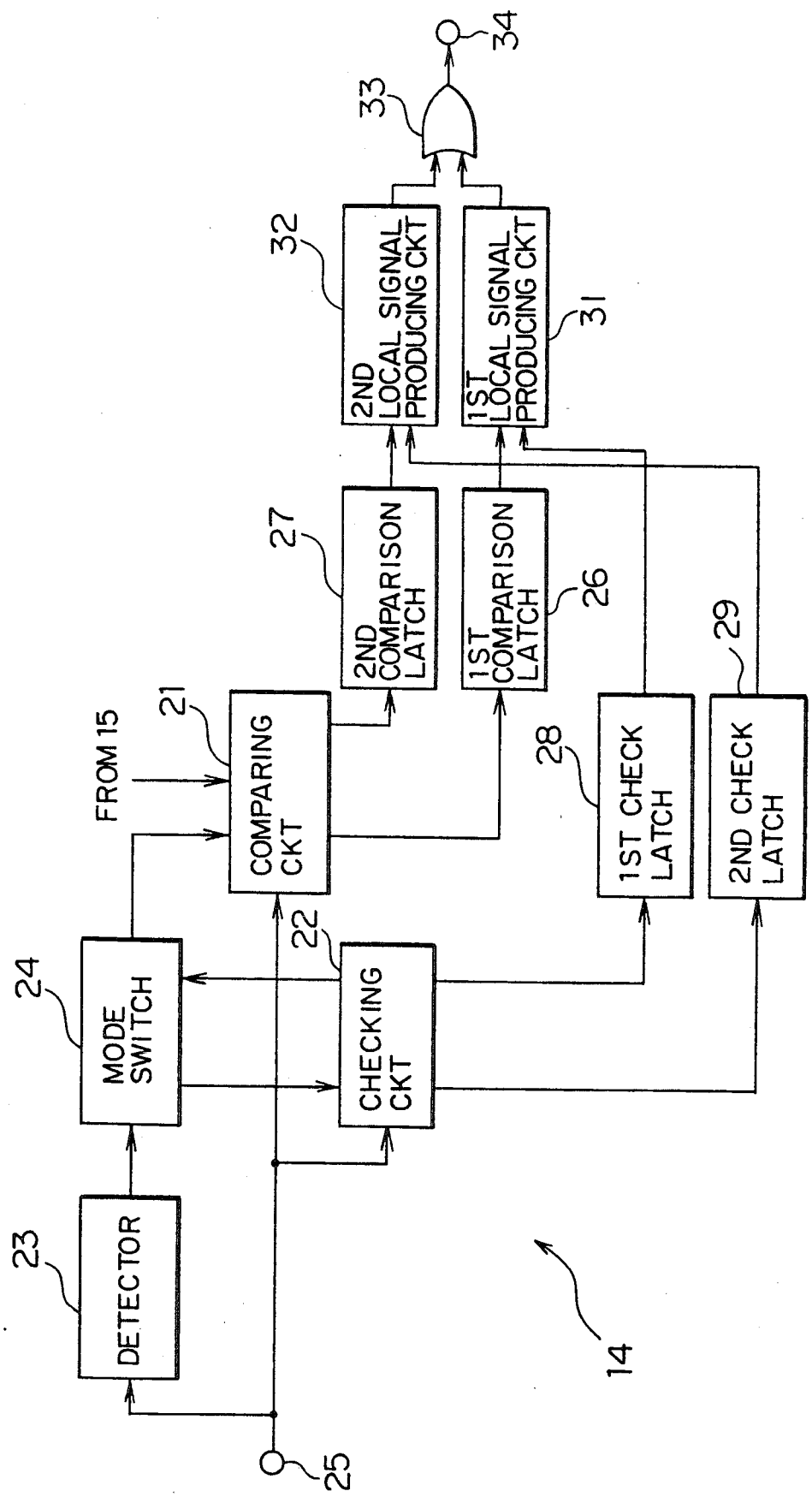
FIG. 3 is a block diagram of a control part included in the radio communication apparatus illustrated in FIG. 1.

Referring to FIG. 3 together with FIGS. 1 and 2, the control part 14 will be described assuming that the second frames F2 are preassigned to the radio paging receiver 10. The control part 14 comprises a comparing circuit 21, a checking circuit 22, a detector 23, and a mode switch 24. Each of the comparing and the checking circuits 21 and 22 has a busy and an idle mode. The detector 23 is connected to the radio part 12 and is supplied with the received signal through a controller input terminal 25. Having detected the synchronization signal CS following the preamble signal PA, the detector 23 produces a detection signal representative of detection of the synchronization signal. The mode switch 24 is connected to the detector 21 and puts the comparing and the checking circuits 21 and 22 into the busy mode by the detection signal.

The comparing circuit 21 is connected to the radio part 12 and the memory 15 and is for carrying out a predetermined comparison operation between the identification number and the received signal within a predetermined error range, such as two bits among the thirty-two bits. When put into the busy mode, the comparing circuit 21 carries out the predetermined comparison operation in response to the received signal. When put into the idle mode, the comparing circuit 21 does not carry out the predetermined comparison operation.

Responsive to the first codeword, the comparing circuit 21 produces a first local comparison result signal representative of a result of the predetermined comparison operation. The result will be called a particular error and will later be described. In other words, the comparing circuit 21 carries out a first local comparison between the identification number and the call number of the first codeword received within the predetermined error range. The comparing circuit 21 will be referred to as a first comparator.

Responsive to the second codeword, the comparing circuit 21 produces a second local comparison result signal representative of a result of the predetermined comparison operation. That is, the comparing circuit 21 carries out a second local comparison between the identification number and the call number of the second codeword received within the predetermined error range. The comparing circuit 21 will be referred to as a second comparator.

The checking circuit 21 is connected to the radio part 12 through the input terminal and is for carrying out a predetermined error check operation on the received signal in the manner known in the art. When put into the busy mode, the checking circuit 22 carries out the predetermined error check operation in response to the received signal. When put into the idle mode, the checking circuit 22 does not carry out the predetermined error check operation.

Responsive to the second codeword, the checking circuit 22 produces a first local error check result signal representative of a result of the predetermined error check operation. The result will be called a specific error and will later be described. In other words, the checking circuit 22 carries out a first local error check on the signal condition of the second codeword. The checking circuit 22 will be referred to as a first checking circuit.

Responsive to the first codeword, the checking circuit 22 produces a second local error check result signal representative of a result of the predetermined error check. Namely, the checking circuit 22 carries out a second local error check on the signal condition of the first codeword. The checking circuit 22 will be referred to as a second checking circuit.

The radio paging receiver 10 further comprises a first comparison latch 26, a second comparison latch 27, a first check latch 28, and a second check latch 29. The first comparison latch 26 is connected to the comparing circuit 21 and is for processing the first local comparison result signal into a first comparison result signal. The first comparison latch 26 will be referred to as a first processor.

The second comparison latch 27 is connected to the comparing circuit 21 and is for processing the second local comparison result signal into a second comparison result signal. The second comparison latch 27 will be referred to as a first processor.

The first check latch 28 is connected to the checking circuit 22 and is for processing the second local check result signal into a first check result signal. The first check latch 28 will be referred to as a second processor.

The second check latch 29 is connected to the checking circuit 22 and is for processing the second local check result signal into a second check result signal. The second check latch 29 will be referred to as a second processor.

A combination of the comparing circuit 21 and the first comparison latch 26 will be referred to as a first comparing arrangement which is for carrying out a first comparison operation between the identification number and the call number of the first codeword. A combination of the comparing circuit 21 and the second comparison latch 27 will be referred to as a second comparing arrangement which is for carrying out a second comparison operation between the identification number and the call number of the second codeword. A combination of the checking circuit 22 and the first check latch 28 will be referred to as a first checking arrangement which is for carrying out a first error check on the signal condition of the second codeword. A combination of the checking circuit 22 and the second check latch 29 will be referred to as a second checking arrangement which is for carrying out a second error check on the signal condition of the first codeword.

The radio paging receiver 10 further comprises a first local signal producing circuit 31, a second local signal producing circuit 32, and an OR gate 33.

The first local signal producing circuit 31 is connected to the first comparison and the first check latches 26 and 28 and carries out judgement in accordance with the first comparison and the first check result signals whether or not the specific error is less than the particular error. When the specific error is less than the particular error, the first local signal producing circuit 31 produces a first local signal. Otherwise, the first local signal producing circuit 31 does not produce the first local signal. A combination of the first local signal producing circuit 31, the first comparing arrangement, and the first checking arrangement is herein referred to as a first control signal producing arrangement which is for producing a first control signal as the first local signal.

The second local signal producing circuit 32 is connected to the second comparison and the second check latches 27 and 29 and carries out judgement in accordance with the second comparison and the second check result signals whether or not the specific error is less than the particular error. When the specific error is less than the particular error, the second local signal producing circuit 31 produces a second local signal. Otherwise, the second local signal producing circuit 31 does not produce the second local signal. A combination of the second local signal producing circuit 32, the second comparing arrangement, and the second checking arrangement is herein referred to as a second control signal producing arrangement which is for producing a second control signal as the second local signal.

The OR circuit 33 is connected to the first and the second local signal producing circuits 31 and 32 and is for producing the above-mentioned announce signal in accordance with the first and the second control signals. The announce signal is supplied to the driver part 16 through a controller output terminal 34. The OR gate 33 is further connected to the driver part 16 through the controller output terminal 34 and serves as an announce signal producing arrangement.

Figure 4:
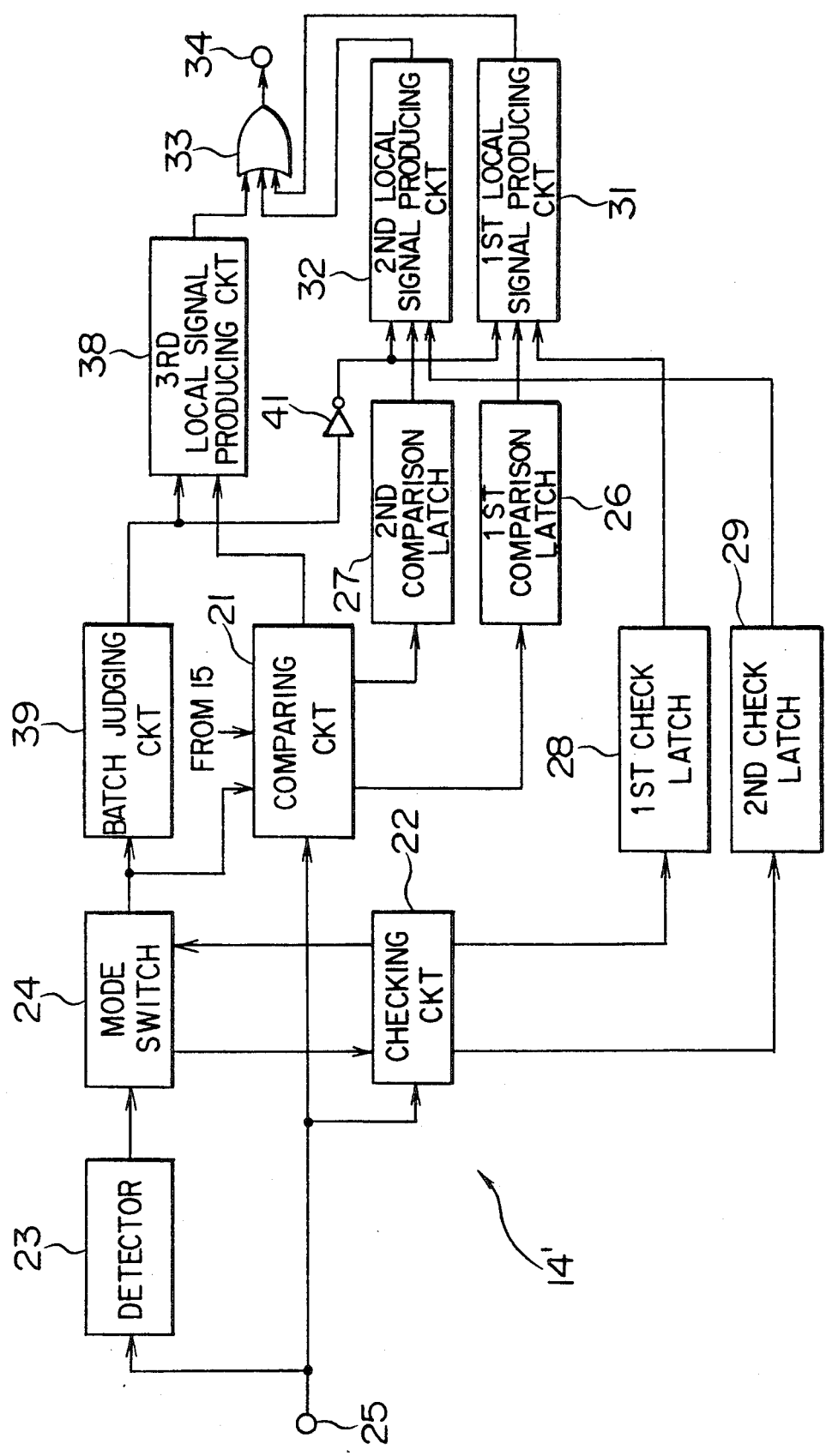
FIG. 4 is a block diagram of a control part included in a radio communication apparatus according to a second embodiment of this invention.

Referring to FIG. 4, description will be made as regards the control part 14 (FIGS. 1 and 3) included as a control part 14' in a radio communication apparatus according to a second embodiment of this invention. The control part 14' comprises similar parts designated by like reference numerals.

The control part 14' further comprises a third local signal producing circuit 38 and a batch judging circuit 39. The third local signal producing circuit 38 is connected to the comparing and the batch judging circuits 21 and 39 and is for producing a third local signal in accordance with the first comparison result signal that is supplied from the comparing circuit 21. Operation of the batch judging circuit 39 and the third local signal producing circuit 38 will be presently described. A combination of the comparing and the third local signal producing circuits 21 and 38 will be referred to as a third control signal producing arrangement which is for producing a third control signal as the third local signal.

Responsive to the third control signal, the OR gate 33 produces the announce signal. The announce signal is supplied to the driver part 16 through the controller output terminal 34.

Each of the first through the third local signal producing circuits 31, 32 and 38 has the busy and the idle modes. When put into the busy mode, the first through the third local signal producing circuits 31, 32, and 38 can produce the first through the third local signals. When put into the idle mode, the first through the third local signal producing circuits 31, 32, and 38 do not produce the first through the third local signals.

The batch judging circuit 39 is connected to the detector 23 through the mode switch 24 and is for judging whether or not the detection signal is representative of detection of the first batch B1. When the detection signal represents detection of the first batch B1, the batch judging circuit 39 produces a batch signal of logic "1". When the detection signal does not represent detection of the first batch B1, the batch signal is presented by logic "0".

The batch judging circuit 39 is further connected to the first and the second local signal producing circuits 31 and 32 through an inverter 41 and to the third local signal producing circuit 38 directly. The inverter 41 is for inverting the logic of the batch signal.

When supplied with the batch signal of the logic "1", each of the first through the third local signal producing circuits 31 and 32 is put into the busy mode. When supplied with the batch signal of the logic "0", each of the first through the third local signal producing circuits 31 and 32 is put into the idle mode. A combination of the batch judging circuit 39 and the inverting element 41 will be referred to as a selecting arrangement which is for selecting either a combination of the first and the second local signal producing circuits 31 and 32 or the third local signal producing circuit 38 as a selected combination or a selected circuit. It will be noted that the control part 14' being illustrated in somewhat complicated as compared with the control part 14 illustrated with reference to FIG. 3. It is, however, unnecessary to carry out the first and the second error checks when the third control signal producing arrangement (21, 38) produces the third local signal in response to the first batch B1. It is therefore possible to simplify operation of the apparatus illustrated with reference to FIG. 1 when the control part 14' is substituted for the control part 14.

While the present invention has thus far been described in connection with only a few embodiments thereof, it will readily be possible for those skilled in the art to put this invention into practice in various other manners. For example, the predetermined error range may be either one bit or more than three bits.

What is claimed is:

1. A radio communication apparatus including a memory for memorizing an identification number specific to said apparatus, receiving means for receiving a radio signal to produce a received signal, announcing means for announcing an announce, and control means for controlling said announcing means in accordance with said identification number and said received signal, said received signal carrying an intermittent succession of frames which are preassigned to said apparatus and each of which comprises a first and a second codeword, each of said first and said second codewords including a call number and received with a signal condition, said control means comprising:

first control signal producing means connected to said receiving means and said memory for producing a first control signal in accordance with said identification number, the call number of said first codeword, and the signal condition of said second codeword;

second control signal producing means connected to said receiving means and said memory for producing a second control signal in accordance with said identification number, the call number of said second codeword, and the signal condition of said first codeword;

announce signal producing means connected to said first control signal producing, said second control signal producing, and said announcing means for producing an announce signal in accordance with said first and said second control signals to make said announcing means announce said announce in compliance with said announce signal.

2. A radio communication apparatus as claimed in claim 1, wherein said first control signal producing means comprises:

first comparing means connected to said receiving means and said memory for carrying out a first comparison between said identification number and the call number of said first codeword to produce a first comparison result signal representative of a result of said first comparison;

first checking means connected to said receiving means for carrying out a first error check on the signal condition of said second codeword to produce a first check result signal representative of a result of said first error check; and first local signal producing means connected to said first comparing and said first checking means for producing a first local signal as said first control signal in accordance with said first comparison and said first check result signals, said second control signal producing means comprising:

second comparing means connected to said receiving means and said memory for carrying out a second comparison between said identification number and the call number of said second codeword to produce a second comparison result signal representative of a result of said second comparison;

second checking means connected to said receiving means for carrying out a second error check on the signal condition of said first codeword to produce a second check result signal representative of a result of said second error check; and second local signal producing means connected to said second comparing and said second checking means for producing a second local signal as said second control signal in accordance with said second comparison and said second check result signals.

3. A radio communication apparatus as claimed in claim 2, wherein said first comparing means comprises:

a first comparator connected to said receiving means and said memory for carrying out a first local comparison between said identification number and said call number of the first codeword received within a predetermined error range to produce a first local comparison result signal representative of a result of said first local comparison; and a first processor connected to said first comparator and said first local signal producing means for processing said first local comparison result signal into said first comparison result signal.

4. A radio communication apparatus as claimed in claim 2, wherein said second comparing means comprises:

a second comparator connected to said receiving means and said memory for carrying out a second local comparison between said identification number and said call number of the second codeword received within a predetermined error range of the call number of said second codeword to produce a second local comparison result signal representative of a result of said second local comparison; and a second processor connected to said second comparator and said second local signal producing means for processing said second local comparison result signal into said second comparison result signal.

5. A radio communication apparatus as claimed in claim 2, wherein said first checking means comprises:

a first checking circuit connected to said receiving means for carrying out a first local error check on the signal condition of said second codeword to produce a first local check result signal representative of a result of said first local error check; and a first processor connected to said first checking circuit and said first local signal producing means for processing said first local check result signal into said first check result signal.

6. A radio communication apparatus as claimed in claim 2, wherein said second checking means comprises:

a second checking circuit connected to said receiving means for carrying out a second local error check on the signal condition of said second codeword to produce a second local check result signal representative of a result of said second local error check; and a second processor connected to said second checking circuit and said second local signal producing means for processing said second local check result signal into said second check result signal.

7. A radio communication apparatus as claimed in claim 1, said received signal further carrying a preamble signal representative of reception of said radio signal and a synchronization signal following said preamble signal, wherein each of said first and said second control signal producing means has a busy and an idle mode, said apparatus further comprising:

a detector connected to said receiving means for detecting said synchronization signal to produce a detection signal representative of detection of said synchronization signal; and a mode switch connected to said detector, said first control signal producing, and said second control signal producing means for putting said first and said second control signal producing means into said busy mode by said detection signal.

8. A radio communication apparatus as claimed in claim 1, said received signal further carrying a preamble signal representative of reception of said radio signal and a synchronization signal following said preamble signal, wherein each of said first and said second control signal producing means has a busy and an idle mode, said apparatus further comprising:

third control signal producing means connected to said receiving and said announce signal producing means and said memory for producing a third control signal in accordance with said identification number and the call number of said first codeword and making said announce signal producing means produce said announce signal in accordance with said third control signal, said first and said second control signal producing means having a busy and an idle mode in common, said third control signal producing means having said busy and said idle modes;

a detector connected to said receiving means for detecting said synchronization signal to produce a detection signal representative of detection of said synchronization signals; and selecting means connected to said detector, said first through said third control signal producing means for selecting from a combination of said first and said second control signal producing means and said third control signal producing means to put said selected means into said mode in accordance with said detection signal and to put the other of said combination and said third control signal producing means into said idle mode.

* * * * *